J. P. BOND.
BRAKE BAND.
APPLICATION FILED JUNE 16, 1919.
1,350,985.
Patented Aug. 24, 1920.
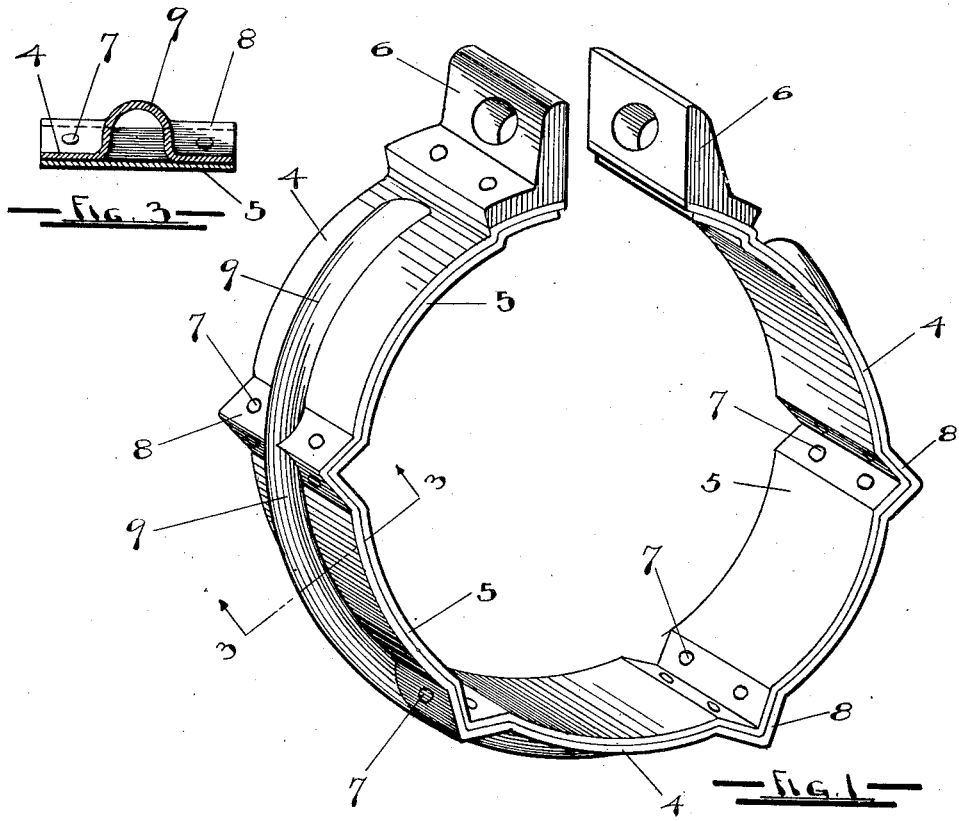
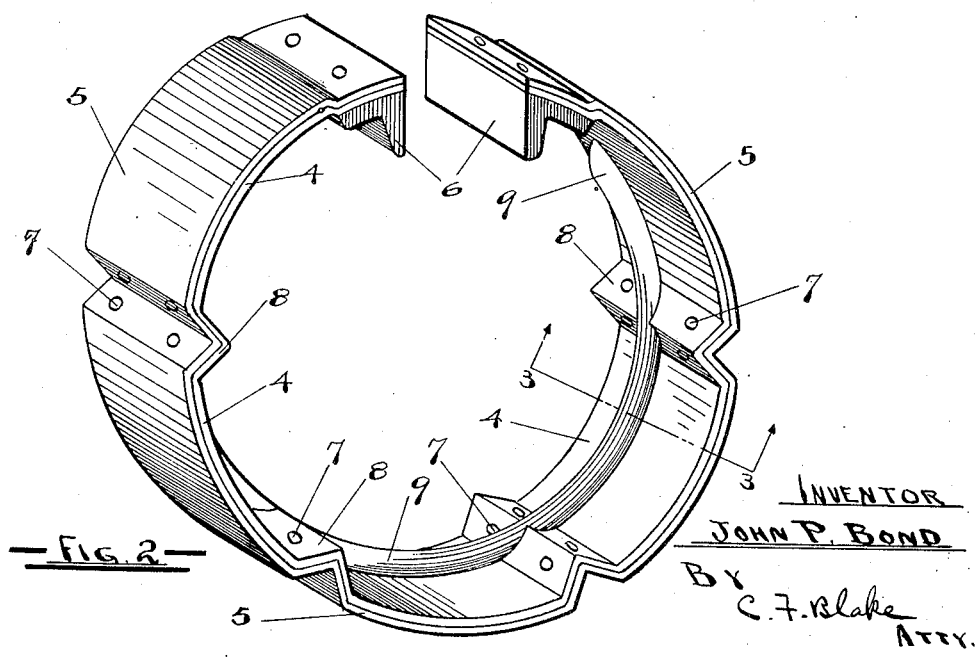
INVENTOR
JOHN P. BOND
BY
C. F. Blake
ATTY.

UNITED STATES PATENT OFFICE.

JOHN P. BOND, OF PORTLAND, OREGON.

BRAKE-BAND.

1,350,985.      Specification of Letters Patent.     Patented Aug. 24, 1920.

Application filed June 16, 1919. Serial No. 304,722.

*To all whom it may concern:*

Be it known that I, JOHN P. BOND, a citizen of the United States, residing at Portland, county of Multnomah, State of Oregon, have invented certain new and useful Improvements in Brake-Bands, of which the following is a specification.

My invention relates to brake bands in general, either of the internal expanding or the external contracting type, and the object of my invention is to provide a brake band to which brake lining of any suitable material may be attached by rivets without the heads of the rivets coming into contact with the drum upon which the band operates.

I accomplish the above object by means of the construction illustrated in the accompanying drawing, which forms a part of this application for Letters Patent, like characters of reference indicating like parts throughout the several views thereof, and in which:

Figure 1 is a perspective view of my device adapted for operation upon the outer peripheral surface of a brake drum.

Fig. 2 is a perspective view of my device adapted for operation upon the inner peripheral surface of a brake drum.

Fig. 3 is a sectional view upon lines 3—3 of Figs. 1 and 2.

My device consists of the brake band 4, lining 5, and suitable lugs 6 attached to the band for operation thereof by any suitable mechanism.

At suitably spaced distances around the band 4 transverse indentures are made therein, these indentures being away from the surface of the band upon which the lining is disposed.

The lining 5 is depressed into these indentures, and riveted to the sides thereof by rivets 7. By this construction, as is obvious from the drawing, the heads of the rivets 7 lie within the respective indentures, and as the lining wears the rivet heads cannot come into contact with the brake drum.

To provide additional stiffness for the band 4 over that possessed by a flat band, I provide a longitudinally disposed indenture 9 therein, said indenture 9 being formed in the same direction as indentures 8.

Said indentures 8 and 9 not only act as depositories for the rivet heads and stiffening members respectively, but combined, they act as oil conveyers to the lining surface upon the brake drum whenever, as is usually the case, this device is operated within an oil filled casing.

My invention may be made of any size, and constructed of any material deemed convenient and suitable for a device of this character, and while I have illustrated and described a form of construction found desirable in materializing my invention, I wish to include in this application for Letters Patent all mechanical equivalents and substitutes that may fairly be considered to come within the scope and purview of my invention as defined in the appended claim.

Having disclosed my invention so that others may be enabled to construct and to use the same, what I claim as new, and desire to secure by Letters Patent is:

A brake band; transversely indented portions in said band; a longitudinally indented portion in said band connecting said transversely indented portions; a flexible lining; and rivets adapted to secure portions of said lining within said transversely disposed indented portions.

In witness whereof I claim the foregoing as my own, I hereunto affix my signature in the presence of two subscribing witnesses at Portland, county of Multnomah, State of Oregon, this 4th day of June, 1919.

JOHN P. BOND.

Witnesses:
    C. F. BLAKE,
    ALBERT J. GROBEN.